May 7, 1963   H. M. J. CHEVALIER   3,088,881
MALTING PLANT
Filed April 21, 1959   2 Sheets-Sheet 1

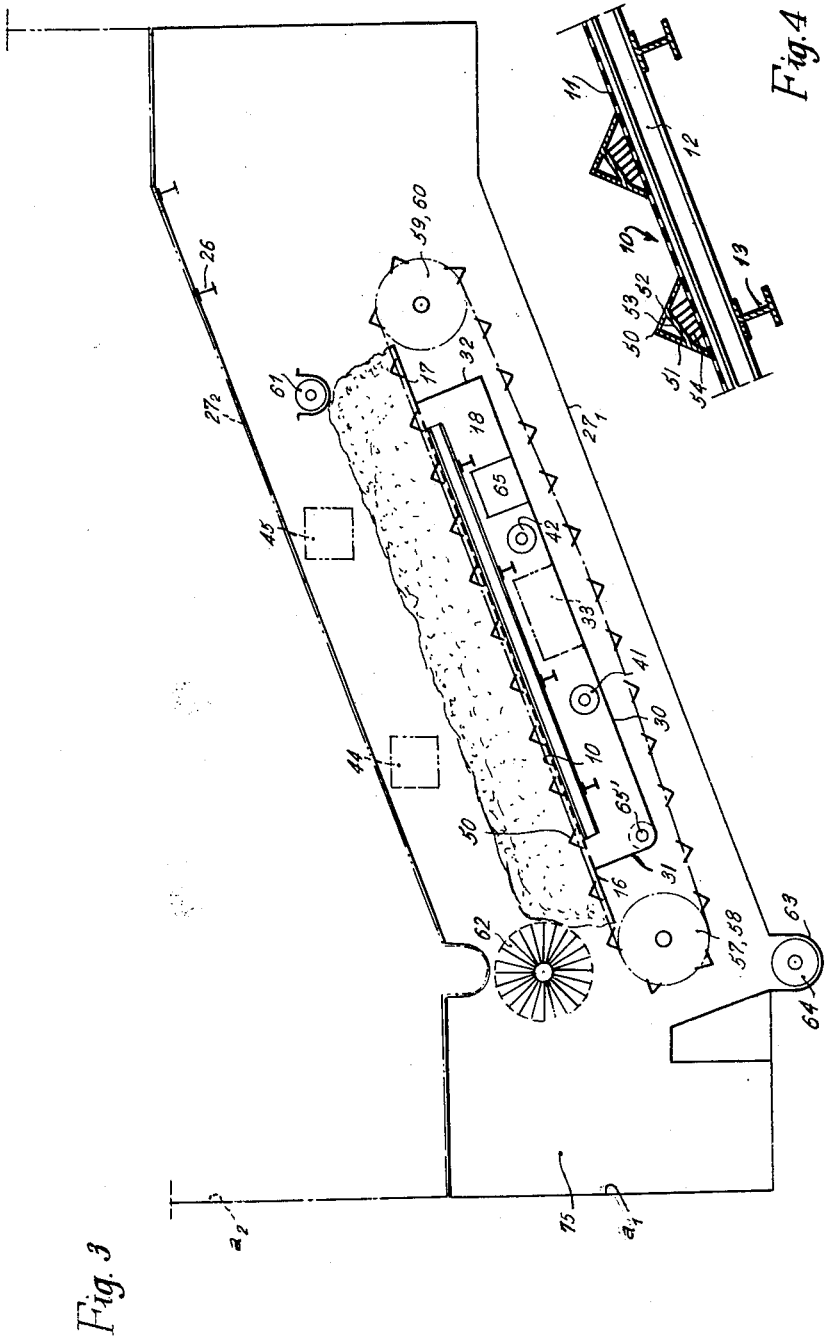

United States Patent Office 3,088,881
Patented May 7, 1963

3,088,881
MALTING PLANT
Hubert Marie Joseph Chevalier, 10 Rue Colonel-Marchand, Dijon, France
Filed Apr. 21, 1959, Ser. No. 807,793
Claims priority, application France Apr. 22, 1958
5 Claims. (Cl. 195—129)

This invention relates to malting plants.

Known malting systems are typified by various disadvantages. For example, they require a considerable amount of labor, with stringent time schedule requirements, or are so complicated mechanically that they are inapplicable in practice, or if applied have proved unsatisfactory because of frequent breakdown, high maintenance requirements, or inadequate allowance for the modifications in the grain during the malting cycle.

It is an object of this invention to provide a malting plant whereby the conversion of barley grain to malt will be ensured automatically, and practically without the need of human action during the entire conversion process, the operator's functions being reduced to adjustment, supervision and servicing.

Another object is to provide a malting plant that will operate continuously, with the charging of fresh barley and the discharge of the malt being performed in essentially uninterrupted manner, and the grain progressing continuously from the input to the output of the system.

Another object is to provide a malting system wherein provision is made at all times for controlling the rate of progress of the natural phenomena involved, within reasonable limits, and thus to compensate when necessary for any operating hazards that may occur, without reducing production, and also making it possible within limits to vary the production rate while still putting out a uniformly high grade of product.

Another object is to provide a system which will be relatively inexpensive to set up on a scale of magnitude corresponding to the production capacity of existent plants.

Another object is to provide a malting plant that will be simple in construction and operation, will stand up well to severe operating strains, with negligibly low hazard of break-down and wherein the desired treatment of the grain in its entirety will be assured under all conditions.

It is a further object of the invention to provide a plant that will have increased versatility, in that it can be readily and quickly converted, with only a few minor changes or additions, to various other uses.

In accordance with one aspect of the invention, means are provided for imparting to the grain, placed on perforate supporting means through which treating air is discharged, a relative motion at a very slow rate but a rate sufficient to prevent an interlinking of the radicles, so that throughout all the phases of the treatment the mass of grain will retain a sufficient degree of mobility to enable its convenient manipulation by mechanical means of simple, conventional construction.

Further according to the invention, the means for imparting to the grain a motion of the type described comprise a sloping perforate floor or tray for supporting the grain, and elements movable with respect to the floor or tray and having the grain resting thereon.

In one embodiment, the said movable elements rest upon the floor or tray and are in the form of brackets or angles having the ends of their flanges engaging the surface of the floor or tray. In this way it is made possible permanently to scrape the tray and prevent a heaping of the grain thereon even though the radicles may have attained substantial growth.

The invention further contemplates providing scraper means for the purpose just specified, positioned in the gaps between the flanges or arms of the angles mentioned above.

An important feature of the invention lies in the fact that the tray is overlying a blast-box or casing through which the treating air is delivered, such casing having means therein for conditioning the treating air so as to provide optimum treating conditions.

In one embodiment of the invention, the angles or brackets project from both sides beyond the ends of the tray so as to be operable from outside the space containing the grain, and in such embodiment it is provided according to the invention that resiliently yielding means, such as rubber strips, are interposed between the tray and the side walls of the compartment, for sealing purposes.

In another form of construction, the angles or brackets are driven from inside the grain compartment, in which case the vertical walls may be connected with the tray in positively air-tight relation.

A malting system according to the invention may comprise any desired number of compartments of the type just outlined. Such compartments may desirably be provided in stacked relation. Each compartment may have a capacity corresponding to one day of treatment; however, means are provided, including chiefly means for adjusting the rate of grain circulation, whereby the dwell time of the grain in the compartment may be controlled at will.

Automatic supply means are provided for forming, and maintaining, a bed of grain at the upper end of the inclined tray, and conveyer means are provided from the lower end of one compartment to the upper end of the next compartment.

The above and further objects, features and advantages of the invention will appear clearly from the ensuing disclosure which is exemplary but not restrictive in character, and which is made with reference to the accompanying drawings, wherein:

FIG. 3 is a diagrammatic view of a compartment in longitudinal section; in this view some of the relative dimensions have been altered with respect to corresponding dimensions in FIGS. 1 and 2; and FIG. 4 is a longitudinal sectional view of part of a grain supporting tray on an enlarged scale.

Figure 1:
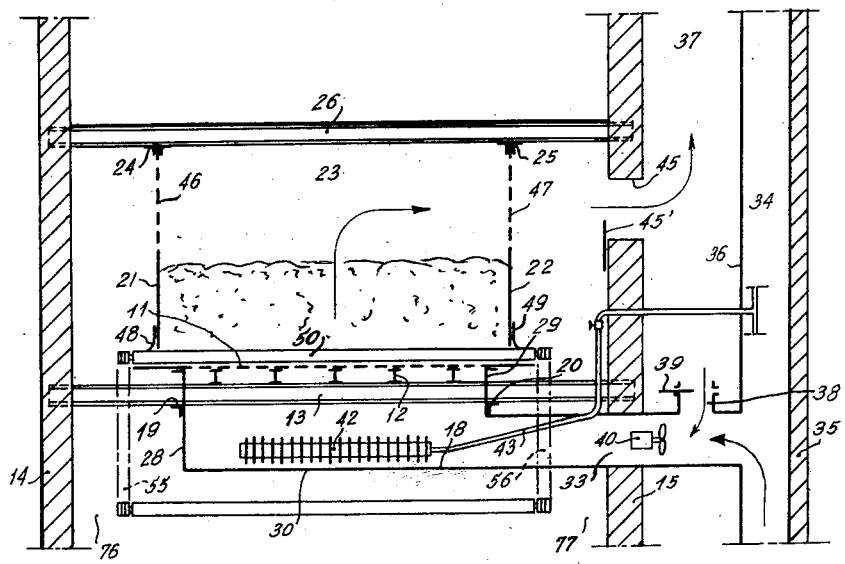
FIG. 1 is a diagrammatic view in transverse section of one compartment in malting plant according to the invention.

The malting plant shown may comprise in a conventional manner means for supplying barley grain from storage silos to a washing unit similar to the grain washing units used in flour mills, serving to remove both heavy and lightweight dirt particles and clean the grain. The washed barley grain falls into a wetting tank having an extractor device associated with the bottom of it.

The above arrangements may be conventional and have not been illustrated. The system according to the invention comprises a number of stacked compartments such as $a1$, $a2$ (see FIG. 3) which may be provided in any suitable number, one convenient number frequently used being seven. The humidified barley grain from the wetting tank is delivered to the top of compartment $a1$ and in this compartment is exposed to treatment for a period of about one day. As the grain reaches the base of the compartment it is taken up and conveyed to the top of the next adjacent compartment $a2$, here the compartment immediately overlying the preceding one, there to be exposed to another one-day's treatment, and so on, until the grain has been passed through all the compartments and the sprouted barley grain is collected as malt from the outlet of the ultimate compartment.

Each compartment comprises a perforate tray 10 consisting of a perforate metal sheet element 11 resting upon longitudinal elements 12 which in turn rest upon transverse girders 13 and these in turn have their ends supported by vertical walls 14 and 15. The longitudinal ends of the tray, as at 16 and 17, may be imperforate. The perforate area of the tray overlies an air-box or casing member 18 supported on angle elements such as 19 and 20 on channel girders 13, the casing substantially corresponding in width, though being slightly smaller (in the embodiment shown) than the spacing between the pair of vertical partition walls 21 and 22 which define the grain compartment 23. The partitions 21 and 22 are supported on angle irons 24 and 25 secured to channel girders 26 supported by the walls 14 and 15 and serving to support the flooring $27_2$ of the compartment next above. The casing 18 is generally box-shaped and includes a pair of longitudinal walls 28 and 29, a bottom wall 30 and end walls 31 and 32. Connected with the wall 29 is a conduit 33 which extends through the wall 15 and connects with a channel 34 defined between an outer wall 35 and a vertical partition 36. Between wall 15 and partition 36 is defined a chimney or stack 37 and the conduit 33 connects with this stack at an opening 38 controllable by a slide valve 39. Positioned within the conduit 33 at a point nearer the box structure 18 than the opening 38, is a fan 40. Mounted in the box structure 18 are a number of heat exchangers, herein two, 41 and 42, and a two-way pipe line 43 is provided for circulating the heating or cooling fluid.

Apertures 44 and 45, are formed in the wall 15 and their effective flow section is adjustable by means of slide valves such as 45'. The side partitions 21 and 22 comprise a number of spaced horizontal strip elements at their upper parts as shown at 46, 47. Associated with the bottom of said partitions are upstanding seal strips 48, 49 made of rubber or the like having their lower edges sealed to the perforate sheet 11. Positioned upon the perforate sheet 11 are a number of transversely extending angles 50 of such length as to project beyond both partitions 21 and 22. Each angle has a pair of flanges 51 and 52 (see FIG. 4) and in the space 53 between the flanges is a brush 54 which yieldingly engages the sheet element 11. The projecting ends of the angles beyond partitions 21 and 22 are secured to chains 55 and 56 each of which forms an endless loop and which are trained around lower end gears 57, 58 and upper end gears 59, 60.

An input conveyer unit 61 for the grain is provided overlying the uper end of the tray 10. The conveyer 61 may, as shown, assume the form of a conveyer screw operating in a trough perforated throughout the width of the compartment in the space between partitions 21 and 22. Means are provided for adjusting the vertical position of the screw with respect to the tray. The conveyer for the lowermost compartment is supplied with grain by way of the extractor device from the wetting tank.

In a modified form, the conveyer may comprise simple screw similar to the screws used for conveying lumps of material such as coal.

Arranged in the lower end part of the compartment is an undercutting or crumbling device 62 of a form sometimes known as a "porcupine," and at the lowermost point 63 of the floor 27 conveyer means, such as 64, are provided, for delivering the grain received thereby to the inlet of the adjacent overlying compartment. An inspection gangway 75 is provided, connecting at its ends with side gangways 76 and 77.

The system described operates as follows:

The input conveyor 61 feeds barley grain that has first been suitably moistened to the tray 10 so as to form and maintain thereon a bed of grain of adjustable depth which depth is controlled by the vertical adjustment of the conveyer screw relatively to the tray. The slope angle of the tray is so predetermined that, as the angles 50 are advanced at an appropriate rate of travel, the mass of grain will be advanced i.e. will advance bodily at the same rate, by a suitable combination of the slope of the perforate tray having the requisite slope angle with the supporting elements sliding along said tray and supporting the mass of grain. The mass of barley is thus bodily advanced in a downward direction and travels through the compartment in a prescribed time. Throughout its travel the grain is exposed to the action of an air blast delivered thereto and having a predetermined degree of moisture through the underlying box structure 18, the air being discharged therethrough by the fan 40 from the conduit 34. The temperature of the delivered air can be adjusted by adjusting the temperature of the fluid flowing through the heat exchangers 41 and 42. The air thus flows through the entire mass of grain without leaving any substantial portions thereof unaerated, and escapes through the perforate upper portions of the vertical partitions and through the apertures or windows 44 and 45 to the chimney 37 and thence to the outer atmosphere. Adjustment of the slide valve 39 makes it possible to withdraw a portion of the air that has already flowed through the grain and recycle it therethrough. Throughout the treatment the grain is moving through the compartment in unison with the motion of the angles 50, and is exposed to the action of the humid air. The grain in contact with the perforate sheet 11 slides along the surface of the latter. The brushing members 34 prevent any grain and/or radicles from becoming permanently lodged within the perforations of the tray 10 and thus prevent a blocking of the tray and a slowing-down or blocking of the ventilating airflow. A permanent cleaning of the tray is effected by the edges forming the ends of the flanges of the angles. These edges are quickly sharpened due to their continual friction against the tray, and clean the latter thoroughly. As the mass of grain reaches the lower part of the compartment it is acted on by the crumbler or undercutter 62 and the grain drops into the pit 63 whence it is taken up by the conveyer 64 and delivered to the inlet of the next overlying compartment. Even though an irregularity should occur in the treatment of the grain in one compartment, depending on the position of the grain within the bed, the fact that the same grain will occupy a different position in the bed within the next higher compartment ensures that at the end of the treatment throughout the plurality of compartments, a satisfactorily uniform result will be obtained.

The conveyers 61 and 64 for the respective stacked compartments extend through the wall 15 and lead to a system of conveyers (not shown) interconnecting all the individual conveyers with the wetting tank from which the input grain is taken, and with a continuous drying drum or malt kiln.

The grain issuing from the compartments corresponding to the third and fourth day treatments are first sorted in an air draft then on a vibrator table and the heavier, slower-sprouting grain may be recycled to a lower compartment.

Due to the general organization of each compartment as described above, supervision of the grain and cleaning and maintenance of the compartment structure during operation are facilitated. An operator can conveniently stand on the floor 27 in the space between walls and the drive chain sprockets, and there perform any necessary servicing and repair operations. If necessary, he can discharge a jet of water through the perforate element 11 from the box structure 18 by way of a door such as 65, in order to clean any areas thereof that may have become clogged up despite the action of the brushes. The washing water is then drained off through the bottom outlet 65'. All the controls are desirably grouped on a panel positioned within the compartment.

Figure 2:
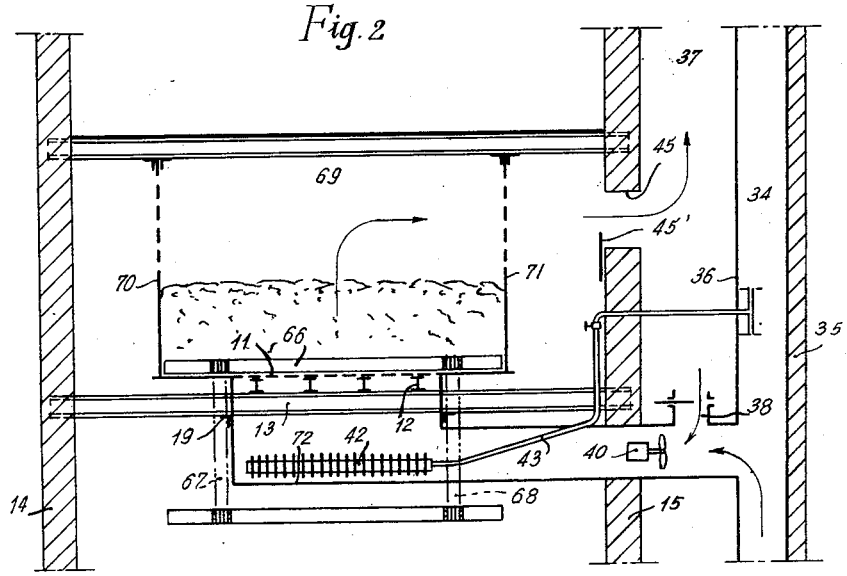
FIG. 2 is similar to FIG. 1 but relates to a modification.

In the embodiment of the invention shown in FIG. 2, the angles 66 do not project beyond the tray 10. They are secured to chains 67 and 68 in the space 69 defined between the longitudinal partitions 70 and 71, so that said chains are thus imbedded within the moving mass of grain. The partitions 70 and 71 can in this case be sealingly secured to the perforate element 11, thereby ensuring a perfectly airtight condition at the base of the partitions. The box structure 72 is disposed beneath the perforate element 11 between the chains 67 and 68.

A malting plant of the type described may have its output rate in terms of grain throughflow varied over a wide range, as determined by the rate of input of the moistened barley. By way of indication it can be stated that an average rate of grain delivery in one such plant is about 2 tons barley per hour.

The rate of rotation of the chain drive sprockets which serve to advance the grain supporting elements is the same in all compartments and is fixed at a predetermined value depending on the selected time of germination. The depth of the bed of grain in the compartments depends primarily on the amount of input barley delivered, but may also vary somewhat with the rate of growth of the radicles. The time of germination may be modified at will so as to obtain an optimum quality of malt product consistent with the selected temperatures and minimum losses.

The system is highly reliable and safe in operation. Thus, it has been found possible without adverse consequences to arrest the grain movement through the compartments for periods of several hours e.g. for repairs, and then advance the grain at a more rapid rate so as to compensate for the shut-down and obtain the desired overall germinating period. During such acceleration the airflow velocity and heating rate should be correspondingly increased.

In cases where the malt stock is received in bulk form and where the malt is also discharged in bulk and the malt kiln is fitted with an automatic furnace, manual handling operations throughout the malting process are practically eliminated. The only manual operations required are those involving adjustment, supervision, cleaning and servicing.

A compartment constructed in the manner described may be used as a tray in a malt kiln. In such case the compartment would be supplied with heated air by a more powerful fan. The exhaust air from one compartment may be discharged to the next compartment for preliminarily drying the material, e.g. in the upper tray of a conventional, two-tray, malt-kiln.

An installation constructed according to the teachings of the invention is also usable as a grain drying system, e.g. at harvest time. In such use the fans should be driven at increased velocity and hot air may be supplied thereto e.g. from the furnace of the malt kiln. The conveyer system should be adapted to cater for a larger capacity than where the system is used as a malting plant. A system according to the invention when used as a grain drying plant will make it possible to condition the entire annual stock of a malting plant in a period of only a few days.

The invention further includes a modified form of embodiment, wherein the moistened grain material is placed upon a movable, perforate, horizontal surface, e.g. composed of steel mesh or chain links, endlessly supported about a pair of drums at the ends of the compartment. The perforate portions frictionally engage the lateral side edges of the box structure and rollers or skates which support the perforate surface and the overlying mass of grain. Just as in the described embodiment, the box structure is supplied with air under pressure, and the air is suitably conditioned, i.e. such air is at a suitable degree of humidity in the case of sprouting compartments, and is dry heated air in the case of malt-kiln and dried compartments.

Further as in the first embodiment described, the trays in the respective compartments preferably carry vertical side panels serving to retain the grain on either side of the compartment. All the drums or sprockets in the various compartment would again be driven at a common speed.

Desirably the respective perforate surfaces may be provided in horizontally displaced or offset relationship with respect to one another, and the surface in one compartment is displaced in reverse direction from the surface in the next compartment, so that with this arrangement the grain material can drop freely from one stage of treatment to the next stage.

Between the third, fourth and fifth stages (for example), means are preferably provided for eliminating lumps or chunks or green malt, and such means may comprise a pair of opposed cylinder rollers fitted with round steel rods normal to their surfaces, the rollers being rotated at differential speeds with the iron rods thereon intermeshing.

As in the illustrated embodiment, the box structure is provided with inspection doors for cleaning the perforate surface with a hose.

Substantial airtightness is obtained by the frictional sliding displacement between the movable perforate surface and the air casing, and between said surface and the lateral sides of the compartment. Thus for example, there may be provided vertically extending rubber strips or the like all around the casing and springs urging the strips into tight engagement with the moving perforate surface. The air casing structure may be carried on transverse girders as in the illustrated construction. It may be divided into two or three sections, with the rate of ventilating air discharged through each section being separately adjustable. Should it be found necessary to reduce air leakage adjacent the moving perforate surface, frames may be laid down on the free surface of the bed of grain, such frames carrying an airtight hood communicating with suction fans adapted to draw out the exhausted or contaminated air and discharge it to atmosphere. The frames tend to follow the bodily motion of the grain, but mechanism is provided for lifting the frames off the surface of the bed at periodic intervals and transfer them back to their initial positions in the compartments.

What is claimed is:

1. A plant for the germination of grain comprising a stationary tray inclined with respect to a horizontal plane, said tray being provided with a plurality of perforations, means for feeding grain to the upper portion of the tray, and forming a layer of grain on said tray, drive means adjacent said tray, bars extending transverse to and on top of the tray and coupled to the drive means, said bars being longitudinally spaced along and in contact with said tray, said drive means advancing said bars to traverse the length of said tray in a determinable period of time for controlling the descent of the mass of grain along said tray, a structure defining a chamber under said tray, fixed partitions extending upwardly from said tray and defining therewith a grain circulation chamber, openings being provided in the upper portion of said chamber, and means for circulating air from the said chamber through the perforated tray and through the mass of grain on said tray, the air being discharged through said openings after passing through the mass of grain, said plant further comprising means in the first said chamber for controlling the temperature of air passing therethrough, and valve means for controllably recirculating a portion of the air passing through the grain circulation chamber back to the first said chamber, inspection and passage openings being provided in said structure for enabling access to the first said chamber.

2. A plant as claimed in claim 1 further comprising means for discharging the grain at the lower portion of the tray.

3. A plant as claimed in claim 1 wherein each said bar comprises two branches connected at a right angle and having free edges in contact with the tray.

4. A plant as claimed in claim 3 comprising means between said branches for sweeping said tray.

5. A plant according to claim 1 comprising flexible sealing strips extending downwardly from said partitions, said bars extending past said strips.

References Cited in the file of this patent

UNITED STATES PATENTS

| | | |
|---|---|---|
| 481,958 | Krause | Sept. 6, 1892 |
| 743,810 | Berg | Nov. 10, 1903 |
| 2,598,313 | Skantze | May 27, 1952 |
| 2,654,691 | Frauenheim | Oct. 6, 1953 |
| 2,671,045 | Ruzicka | Mar. 2, 1954 |